(12) United States Patent
Killian et al.

(10) Patent No.: US 7,659,823 B1
(45) Date of Patent: Feb. 9, 2010

(54) TRACKING VARIABLE CONDITIONS USING RADIO FREQUENCY IDENTIFICATION

(75) Inventors: Thomas Killian, Westfield, NJ (US); Christopher Rice, Parsippany, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 335 days.

(21) Appl. No.: 11/725,776

(22) Filed: Mar. 20, 2007

(51) Int. Cl.
*G08B 13/14* (2006.01)

(52) U.S. Cl. .................. 340/572.4; 340/572.1

(58) Field of Classification Search .......... 340/572.1, 340/10.41, 505, 539.1, 825.69, 825.72; 700/215, 700/225
See application file for complete search history.

(56) References Cited

U.S. PATENT DOCUMENTS

| | | | |
|---|---|---|---|
| 5,774,876 A * | 6/1998 | Woolley et al. ............. 700/215 |
| 6,563,417 B1 * | 5/2003 | Shaw ....................... 340/572.1 |
| 6,617,963 B1 * | 9/2003 | Watters et al. ........... 340/10.41 |
| 6,919,803 B2 * | 7/2005 | Breed ....................... 340/539.1 |
| 7,081,818 B2 | 7/2006 | Eckstein et al. |
| 7,091,861 B2 * | 8/2006 | Schmidtberg et al. .... 340/572.1 |
| 7,100,052 B2 | 8/2006 | Ghazarian |
| 7,161,489 B2 | 1/2007 | Sullivan et al. |
| 7,278,571 B2 * | 10/2007 | Schmidtberg et al. ....... 235/383 |
| 2006/0267731 A1 | 11/2006 | Chen |
| 2006/0273903 A1 | 12/2006 | Kim et al. |
| 2007/0001851 A1 | 1/2007 | Reynolds et al. |

* cited by examiner

*Primary Examiner*—John A Tweel, Jr.

(57) ABSTRACT

A method and system for tracking variable conditions using radio frequency identification (RFID) are disclosed. In embodiments of the present invention, an RFID sensor tag is used to measure a condition. The condition can be any measurable condition such as location, temperature, humidity, pressure, time, date, inertial measurements, etc. Variable data representing the measured condition is read from the RFID sensor tag in order to track the measured condition. The variable data can be read from RFID sensor tags in addition to reading tag identification data from RFID tags, so that the variable data can be associated with tag identification data.

14 Claims, 3 Drawing Sheets

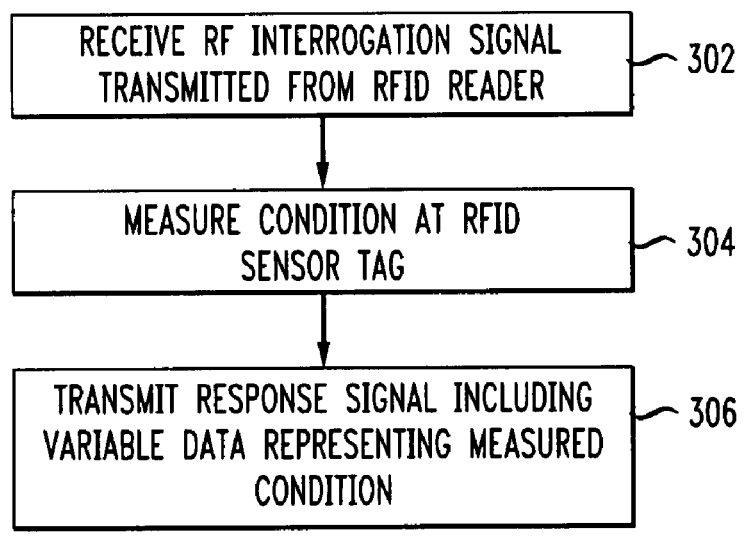
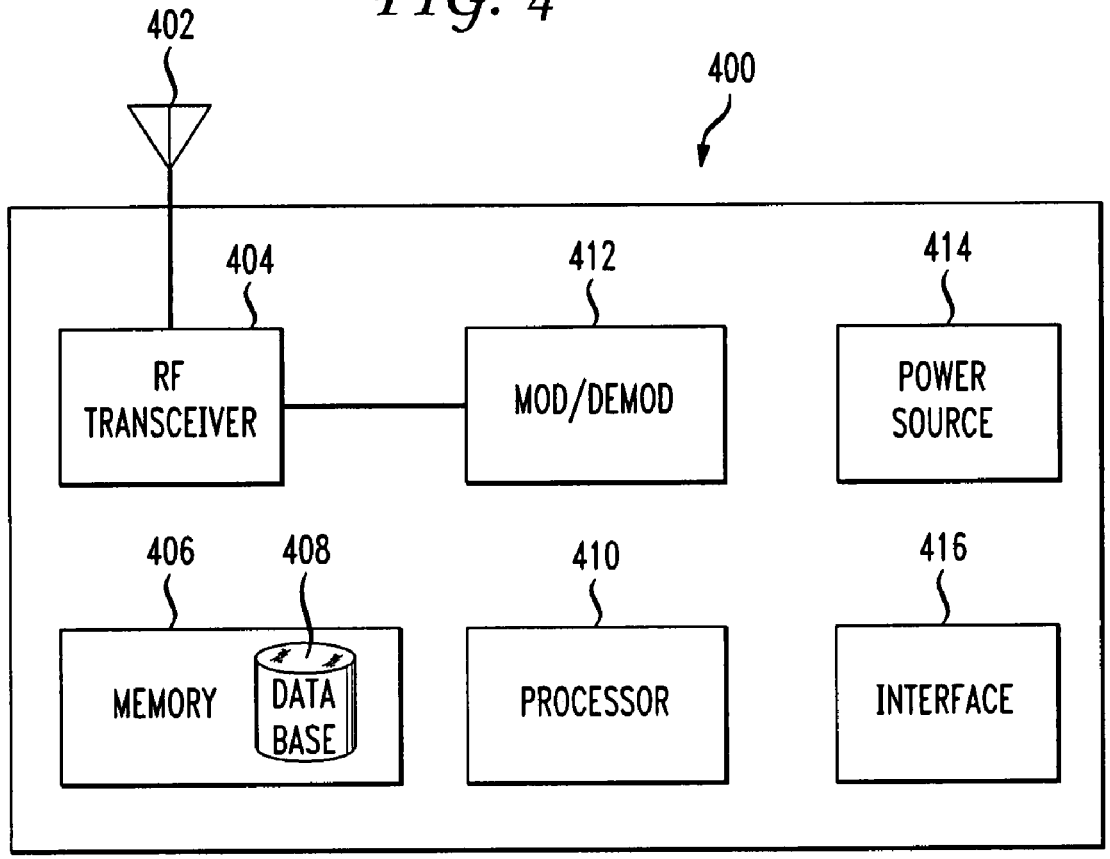

FIG. 5

```
TRANSMIT RF INTERROGATION SIGNAL  —502
              ↓
RECEIVE RESPONSE SIGNALS FROM
      DETECTED RFID TAGS         —504
              ↓
STORE RECEIVED VARIABLE DATA TAG
      IDENTIFICATION DATA        —506
              ↓
ASSOCIATE TAG IDENTIFICATION DATA WITH
          VARIABLE DATA          —508
```

FIG. 6

| 602 | 604 | 606 |
|---|---|---|
| 03-05-2007 | 03:30:01 | 0000003140601200 |
| 03-05-2007 | 03:30:02 | 9900000000027093 |
| 03-05-2007 | 03:31:10 | 0000003140600714 |
| 03-05-2007 | 03:31:11 | 9900000000027091 |
| 03-05-2007 | 03:32:01 | 0000008450604918 |
| 03-05-2007 | 03:32:02 | 9900000000027090 |
| 03-05-2007 | 03:33:07 | 0000003140600762 |
| 03-05-2007 | 03:33:08 | 9900000000027092 |
| 03-05-2007 | 03:34:47 | 0000003140600896 |
| 03-05-2007 | 03:34:48 | 9900000000027090 |

TRACKING VARIABLE CONDITIONS USING RADIO FREQUENCY IDENTIFICATION

BACKGROUND OF THE INVENTION

The present invention is generally directed to radio frequency identification (RFID). More specifically, the present invention is directed to using RFID to track a variable condition.

Radio frequency identification (RFID) is a term for technologies that use radio waves to automatically detect RFID tags. There are several methods of identification, but the most common is to store a serial number that identifies the tag, and perhaps other information, on a microchip that is attached to an antenna (the chip and the antenna together are called an RFID transponder or an RFID tag). The antenna enables the chip to transmit the identification information to an RFID reader. The RFID reader typically converts the radio waves reflected back from the RFID tag into digital information.

RFID automatic identification methods can be used for the tracking of assets in a supply chain. RFID tags each having a unique identification number are typically attached to or incorporated in an asset, such as equipment, products, personnel, etc. The identification number of an RFID tag has a static value that is used to identify the RFID tag. As the tagged assets move, RFID readers read the identification number of the RFID tags in order to track the location of the tagged assets. Typically, RFID readers are stationary and can read tags within a certain range, regardless of a direct line of sight between a reader and a tag. Since RFID offers the benefits of detection of assets in proximity to a reader, rather than a line of sight required by bar code technology, RFID technology is seen as a likely successor to bar code technology in asset tracking.

RFID tags can be passive or active. Passive tags do not require an internal power source, and are powered by an electrical current induced from the RF signal transmitted by an RFID reader. The lack of an internal power supply allows passive RFID tags to be small and inexpensive. Unlike passive RFID tags, active RFID tags have internal power sources which are used to power the tags. Active tags are typically more reliable than passive tags and can transmit at higher power levels than passive tags, allowing them to transmit longer distances.

BRIEF SUMMARY OF THE INVENTION

The present invention provides a method and system capable of tracking variable conditions using radio frequency identification (RFID). In embodiments of the present invention, an RFID sensor tag is used to measure a condition. The condition can be any measurable condition such as location, temperature, humidity, pressure, time, date, inertial measurements, etc. Variable data representing the measured condition is transmitted from the RFID sensor tag in order to track the measured condition. The variable data can be received from RFID sensor tags in addition to receiving tag identification data from RFID tags, so that the variable data can be associated with tag identification data.

In one embodiment of the present invention, an RFID reader device transmits a radio frequency interrogation signal in order to detect RFID tags positioned within a range of the radio frequency interrogation signal. In response to the radio frequency interrogation signal, the RFID reader device receives a response signal from an RFID tag, the response signal including variable data representing a measured condition at the RFID tag. The response signal may also include non-variable data used to identify the variable data as measurement data. The RFID reader device may receive a plurality of response signals each from one of a plurality of RFID tags. In this case, at least one of the plurality of response signals can include variable data representing a measured condition at the respective one of the plurality of RFID tags, and at least one of the plurality of response signals can include tag identification data of the respective one of the plurality of RFID tags. The tag identification data can be associated with the variable data based on a time at which the tag identification data and the variable data are received by the RFID reader.

In another embodiment of the present invention, an RFID tag receives a radio frequency interrogation signal transmitted from an RFID reader device. The RFID tag measures a condition, and transmits a response signal including variable data representing the measured condition to the RFID reader device. The RFID tag may also include non-variable data identifying the variable data as measurement data in the response signal.

These and other advantages of the invention will be apparent to those of ordinary skill in the art by reference to the following detailed description and the accompanying drawings.

BRIEF DESCRIPTION OF THE DRAWINGS

FIG. 3 illustrates a method of operation of an RFID sensor tag according to an embodiment of the present invention;

FIG. 4 illustrates a block diagram of an RFID reader according to an embodiment of the present invention;

FIG. 5 illustrates a method of operation of an RFID reader according to an embodiment of the present invention; and FIG. 6 illustrates exemplary database records storing variable data and tag identification data.

DETAILED DESCRIPTION

Figure 1:
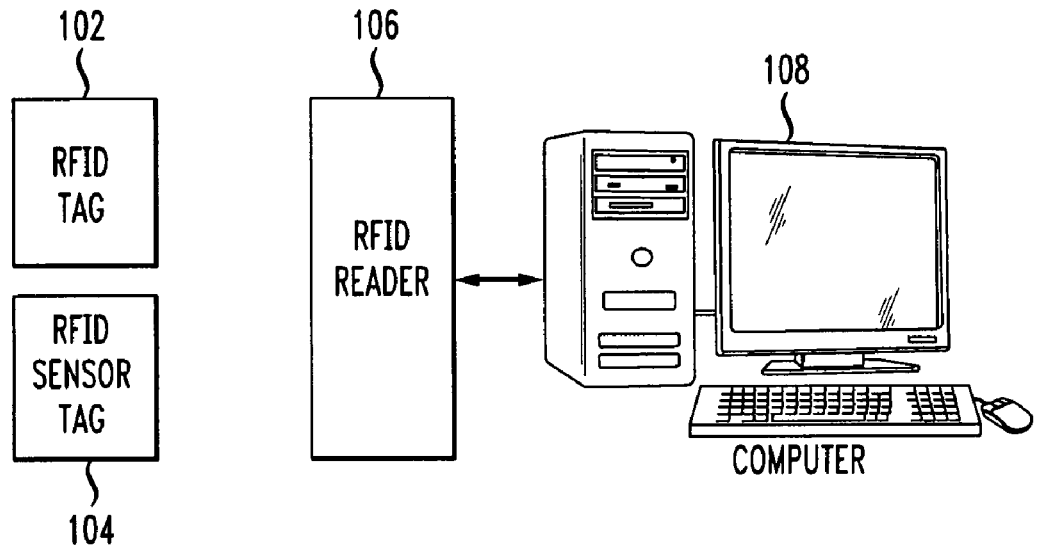
FIG. 1 illustrates an RFID system capable of implementing an embodiment of the present invention.

FIG. 1 illustrates an RFID system capable of implementing an embodiment of the present invention. As illustrated in FIG. 1, the system includes an RFID tag 102, an RFID sensor tag 104, and RFID reader 106, and a computer 108. The RFID reader 106 transmits an RF interrogation signal in order to detect the RFID tag 102 and RFID sensor tag 104. In response to the RF interrogation signal, the RFID tag 102 and the RFID sensor tag transmit response signals to the RFID reader 106. The RFID tag 102 transmits a response signal including tag identification data, such as a tag serial number, to the RFID reader 106, as is well known in the art. The RFID sensor tag 104 transmits a response signal including variable data, representing a condition measured by the RFID sensor tag 104, to the RFID reader 106. As used here, the "condition" measured by the RFID sensor tag 104 refers to any measurable condition such as location, temperature, pressure, humidity, time, date, inertial measurements, etc. The sensor RFID tag 104 is described in greater detail in FIG. 2. The RFID reader 106 can communicate with the computer 108 and transmit the tag identification data and the variable data received from RFID tag 102 and RFID sensor tag 104, respectively, to the computer 108.

Figure 2:
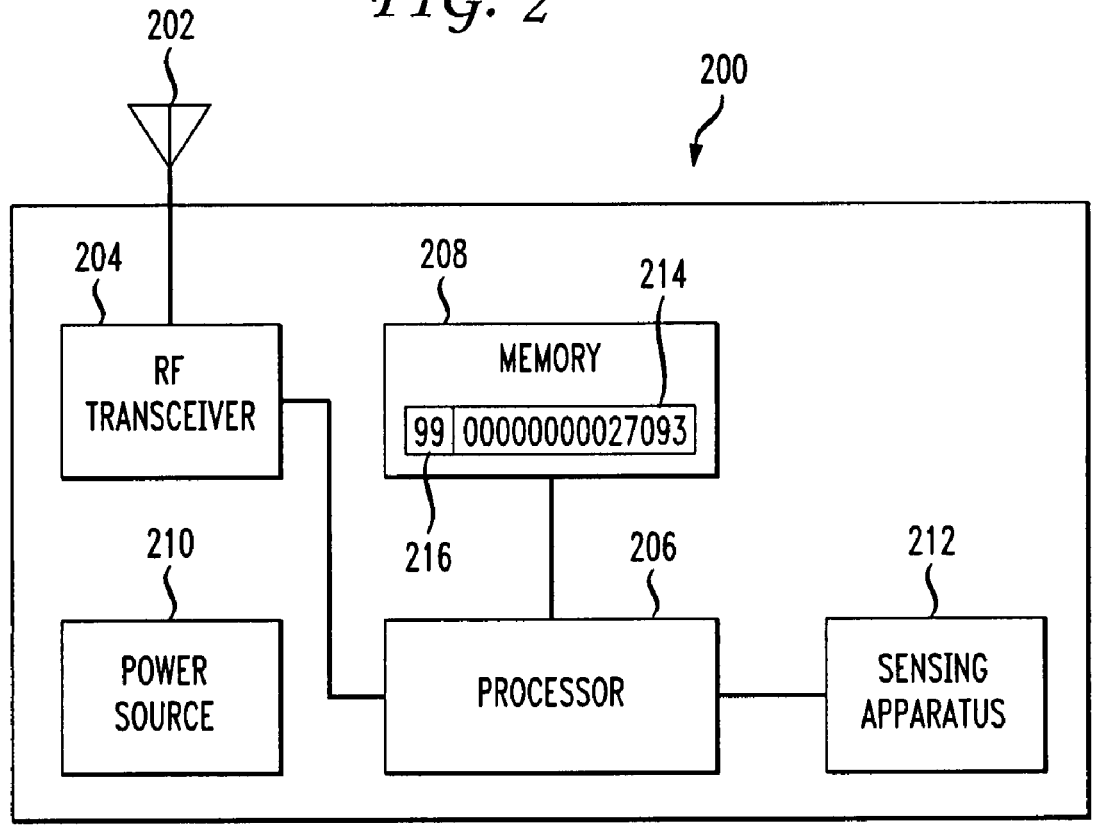
FIG. 2 illustrates a block diagram of an RFID sensor tag according to an embodiment of the present invention.

FIG. 2 illustrates a block diagram of an RFID sensor tag 200 according to an embodiment of the present invention. As illustrated in FIG. 2, RFID sensor tag 200 includes an RF transceiver 204 that transmits and receives RF signals through an antenna 202, a processor 206, a memory 208, a power source 210, and sensing apparatus 212. The sensing apparatus 212 measures a condition at the RFID sensor tag 200. A used herein, measuring a condition "at" the sensor tag 200, refers to any measurement of a condition in the vicinity of the sensor tag 200. Accordingly, the sensing apparatus 212 includes some sensor or device capable of measuring the condition. For example, according to an embodiment of the present invention, the sensing apparatus 212 can be equipped with a GPS receiver to measure the geographic location of the RFID sensor chip 200. According to other embodiments of the present invention, the sensing apparatus 212 can alternatively be equipped with sensors which measure temperature, humidity, pressure, inertial measurements (e.g., speed, acceleration), etc. According to another embodiment of the present invention, the sensing apparatus 212 can be equipped with a clock or the like to measure the time of day and/or the date.

The memory 208 stores variable data 214 and non-variable data 216. The measurements of the sensing apparatus 212 are stored in the memory 208 as variable data 214. Thus, the variable data 214 varies based on the measured condition. The non-variable data 216 can identify the variable data as measured data, and more specifically may identify a type of measured data. For example, the non-variable data 216 can be a numeric code representing measured data or a specific type of measured data. As illustrated in FIG. 2, the numeric code 99 can represent that the variable data 214 is measured data or that the variable data 214 is temperature data. As illustrated in FIG. 2, the value of 00000000027093 stored as the variable data 214 is temperature in hundredths of a Kelvin (270.93 K) measured by the sensing apparatus 212. According to an embodiment of the present invention, the non-variable data 216 and the variable data 214 may be combined to be in the same format as tag identification information of an RFID tag. For example, as illustrated in FIG. 2, the non-variable data 216 and the variable data 214 combined for a value of 9900000000027093. Since the variable data representing a measured condition is in the same format as tag identification data of a convention RFID tag, RFID sensor tags can operate together with conventional RFID tags with no change to infrastructure.

The RF transceiver 204 can receive an RF interrogation signal through the antenna 202. In response, the processor 206 controls the RF transceiver 204 to perform a backscattering operation to transmit an RF response signal. The RF response signal includes the non-variable data 216 and the variable data 214. As described above, the variable data 214 represents a measured condition by the sensing apparatus 212. Accordingly, the RF response signal includes data which appears as tag identification data, but contains variable data 214 representing a measured condition and non-variable data 216 that identifies the variable data 214 as being measured data. The processor 206 controls overall operations of the RFID sensor tag 200. The processor 206 can execute stored computer program codes providing computer program instructions for controlling the operations of the RFID sensor tag 200. The processor 206 controls the backscattering operation performed by the RF transceiver 204, as well as controlling the sensing apparatus 212 to perform measurements. Although the processor 206 is shown in FIG. 2 as a single block, it is possible that the processor 206 includes a microprocessor for controlling the backscattering operation and a separate processor for controlling other operations of the RFID sensor tag 200. The RFID sensor 200 can be powered by a power supply 210, such as a battery.

FIG. 3 illustrates a method of operation of an RFID sensor tag according to an embodiment of the present invention. Referring to FIGS. 2 and 3, at step 302, an RF interrogation signal is received at the RFID sensor tag 200. The RF transceiver 204 receives the RF interrogation signal through the antenna 202. The RF interrogation signal is an RF signal transmitted from an RFID reader in order to detect RFID tags and request tag information from detected RFID tags.

At step 304, a condition is measured at the RFID sensor tag 200 by the sensing apparatus 212 of the RFID sensor tag 200. According to an embodiment of the present invention, the processor 206 controls the sensing apparatus 212 of the RFID sensor tag 200 to measure the condition in response to the RF transceiver 204 receiving the RF interrogation signal. Thus, when the RF interrogation signal is received, the sensing apparatus 212 measures the condition and stores the measurement data as the variable data 214 in the memory 206. According to another embodiment of the present invention, the sensing apparatus 212 measures the condition independently of the RF interrogation signal. For example, the processor 206 can control the sensing apparatus 212 to measure the condition at a regular time interval and store the most recent measurement as the variable data 214 in the memory 208.

At step 306, in response to RF interrogation signal, the RFID sensor tag 200 transmits an RF response signal including variable data 214 representing the measured condition at the RFID sensor tag 200. The response signal can also include the non-variable data 216 which identifies the variable data 214 as measurement data. As described above the non-variable data 216 can be combined with the variable data 214 to appear as tag identification data. The RF response signal is transmitted by the RF transceiver 204 through the antenna 202 to the RFID reader that transmitted the RF interrogation signal using a backscattering operation. Thus, in essence, the RFID sensor tag 200 simulates a response signal from conventional RFID tag including tag identification data. However, the tag identification data of a conventional RFID tag does not vary. Instead of non-varying tag identification data, the RFID sensor tag 200 transmits variable data based a measured condition (along with a non-variable identifier) which appears to the RFID reader as tag identification data.

FIG. 4 illustrates a block diagram of an RFID reader 400 according to an embodiment of the present invention. The RFID reader 400 includes an RF transceiver 404 that transmits and receives RF signals through an antenna 402. The RF transceiver 404 transmits RF interrogation signals in a certain frequency band through the antenna 402 in order to detect any RFID tags within a range of a transmitted RF interrogation signal, and receives backscattered RF signals through the antenna 402 in response. A modulator/demodulator 412 modulates outgoing RF signals being transmitted by the RF transceiver 404 and demodulates incoming RF signals received by the RF transceiver 404. A memory 406 can be used to store data received by the RF transceiver 404 including tag identification data received from conventional RFID tags and variable data measured at RFID sensor tags. As illustrated in FIG. 4, the memory 406 can include a database 408 for storing the tag identification data and the variable data. It is also that tag identification data and variable data from an interrogation are stored in the memory 406 temporarily, and then transmitted to an external computer device or storage device in communication with the RFID reader 400. The RFID reader includes an interface 416 for communicating with such an external computer device or storage device. The interface 416 may be a network interface for communicating with external devices via a network. A processor 410 controls overall operations of the RFID reader 400, and a power source, such as a battery, supplies power to the RFID reader 400. The processor 410 can execute stored computer program codes providing computer program instructions for controlling the operations of the RFID reader 400. RFID readers are well known in the art, and one skilled in the art will recognize that an implementation of an actual RFID reader may contain other components as well, and that FIG. 4 is a high level representation of such an RFID reader for illustrative purposes.

FIG. 5 illustrates a method of operation of an RFID reader according to an embodiment of the present invention. Referring to FIGS. 4 and 5, at step 502, the RFID reader 400 transmits an RF interrogation signal. As described above, the RF transceiver 404 transmits the RF interrogation signal in a certain frequency band through the antenna 402 in order to detect any RFID tags within a range of a transmitted RF interrogation signal. It is possible that the RF transceiver 404 continuously transmits the RF interrogation signal through the antenna 402 in order to detect any RFID tag that comes within the range of the RF interrogation signal. It is also possible that the RF transceiver 404 intermittently transmits the RF interrogation signal through the antenna 402, such as at a regular time interval, or in response to a user input.

At step 504, in response to the transmitted RF interrogation signal, the RFID reader 400 receives response signals from RFID tags and RFID sensor tags located within the range of the RF interrogation signal. The response signals are backscattered RF signals transmitted from the RFID tags and RFID sensor tags. Each response signal received from a conventional RFID tag includes tag identification data, such as a serial number, identifying the RFID tag. Each response signal received from an RFID sensor tag includes variable data representing a measured condition at the RFID sensor tag. Each response signal received from an RFID sensor tag can also include non-variable data identifying the variable data as measured data (or a specific type of measured data). Since the variable data is in the format of tag identification data, the RFID reader 400 cannot differentiate between conventional RFID tags and RFID sensor tags when receiving the response signals.

At step 506, the variable data received from RFID sensor tags and the tag identification data received from conventional RFID tags are stored. For example, the RFID reader 400 can store the variable data and the tag identification data in a database 408 in the memory 406 of the RFID reader. It is also possible that the RFID reader 400 transmits the variable data and the tag identification data to an external computer via the interface 416 in order to be stored in a database in memory of the external computer. FIG. 6 illustrates exemplary database records storing variable data and tag identification data. As illustrated in FIG. 6, each database record includes a date field 602, a time field 604, and a tag data field 606. The date field 602 and the time field 604 are based on a timestamp of a time at which the data was read by the RFID reader. The tag data field 606 stores the tag identification data received from a conventional RFID tag or variable data representing a measured condition at an RFID sensor tag. As illustrated in FIG. 6, entries in the tag data field beginning with the digits "00" are serial numbers (tag identification data) of conventional RFID tags, and entries in the tag data field beginning with the digits "99" are temperature measurements (variable data) measured by an RFID sensor tag. For each entry of variable data, the "99" is a non-variable identifier that identifies the rest of the entry as measured data (or temperature data), and the remaining digits is a measured temperature in hundredths of a Kelvin. As illustrated in FIG. 6, the measured data is in the same format as the serial numbers, and the measured data and serial numbers are stored together in the same database.

Returning to FIG. 5, at step 508, tag identification data is associated with variable data representing a measured condition. According to an embodiment of the present invention, the tag identification data can be associated with variable data based on respective timestamps of the tag identification data and the variable data. For example, as illustrated in FIG. 6, the data and time fields 602 and 604 can be used to associate tag identification data and variable data received at approximately the same time. It is also possible to interpolate between stored records of the variable data in order to approximate a value of the measured condition to associate with tag identification data, if no variable data is received at the same time as the tag identification data. Accordingly, the present invention can be used to associate measured information (i.e., geographic location, temperature, humidity, etc.) with a tag identification data, using a common RFID reader.

Using the above described embodiments of the present invention, additional information representing measured conditions can be collected, stored and associated with RFID tag identification information. The present invention uses a common data collection system to collect the tag identification data and the additional information representing measured conditions, and the tag identification data and the additional information can be stored and analyzed together.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of operation of an RFID tag comprising:
  measuring a condition at the RFID tag; and
  transmitting a response signal including variable data representing the measured condition to an RFID reading device in response to a radio frequency interrogation signal, said response signal further including non-variable data identifying the variable data as measured data and identifying the type of measured condition represented by the variable data.

2. The method of claim 1, wherein said step of transmitting a response signal comprises:
  combining the non-variable data and the variable data into a format of tag identification data; and
  transmitting the combined non-variable data and variable data to said RFID reading device.

3. The method of claim 1, wherein said step of measuring a condition at the RFID tag comprises:
  measuring the condition at the RFID tag in response to said radio frequency interrogation signal.

4. The method of claim 1, wherein said step of measuring a condition at the RFID tag comprises:
  measuring the condition at the RFID tag at a regular time interval; and
  storing variable data resulting from a most recent measurement of the condition.

5. The method of claim 4, wherein said step of transmitting a response signal comprises:

transmitting a response signal including the variable data resulting from the most recent measurement of the condition.

6. A method of operating an RFID reader device comprising:
- transmitting a radio frequency interrogation signal;
- receiving a plurality of response signals each from one of a plurality of RFID tags in response to said radio frequency interrogation signal, at least one of the plurality of response signals including variable data representing a measurement taken by a first one of the plurality of RFID tags, and at least one of the plurality of response signals including tag identification data of a second one of the plurality of RFID tags;
- storing the variable data and the tag identification data in a database; and
- associating the tag identification data of the second one of the plurality of RFID tags with the variable data representing the measurement taken by the first one of the plurality of RFID tags.

7. The method of claim 6, wherein said at least one of the plurality of response signals including variable data further includes non-variable data identifying the variable data as measured data.

8. The method of claim 7, wherein said non-variable data identifies the type of measurement represented by the non-variable data.

9. The method of claim 7, wherein the non-variable data and the variable data are combined in a format of tag identification data.

10. The method of claim 6, wherein said step of associating the tag identification data of the second one of the plurality of RFID tags with the variable data representing the measurement taken by the first one of the plurality of RFID tags comprises:
- associating the tag identification data with the variable data based on database timestamps assigned to the tag identification data and the variable data.

11. An RFID sensor tag comprising:
- means for measuring a condition at the RFID sensor tag; and
- means for transmitting a response signal including variable data representing the measured condition to a RFID reading device in response to a radio frequency interrogation signal, said response signal further including non-variable data identifying the variable data as measured data and identifying the type of measured condition represented by the variable data.

12. The RFID sensor tag of claim 11, wherein said means for transmitting a response signal comprises:
- means for combining the non-variable data and the variable data into a format of tag identification data; and
- means for transmitting the combined non-variable data and variable data to said RFID reading device.

13. The RFID sensor tag of claim 11, wherein said means for measuring a condition at the RFID tag comprises:
- means for measuring the condition at a regular time interval; and
- means for storing variable data resulting from a most recent measurement of the condition.

14. An RFID sensor tag comprising:
- an antenna;
- a sensing apparatus for measuring a condition at said RFID sensor tag; and
- an RF transceiver connected to said antenna for transmitting a radio frequency response signal comprising variable data representing the measured condition to an RFID reader in response to a radio frequency interrogation signal, said response signal further including non-variable data identifying the variable data as measured data and identifying the type of measured condition represented by the variable data.

* * * * *